United States Patent Office 3,214,459
Patented Oct. 26, 1965

3,214,459
LOWER ALKYL BETA-(1-ALKYNYLCYCLO-
ALKOXY)ACRYLATE ESTERS
Lee A. Miller, Kirkwood, Mo., assignor to Monsanto
Company, a corporation of Delaware
No Drawing. Filed Sept. 21, 1961, Ser. No. 139,843
2 Claims. (Cl. 260—468)

This application is a continuation-in-part of my copending application Serial No. 846,252, filed October 14, 1959 now abandoned, which is a continuation-in-part of application Ser. No. 823,371, filed June 29, 1959, now abandoned.

This invention relates to a method of making estervinylated alcohols and the new estervinylated compounds produced thereby.

New and useful estervinylated alcohols produced according to the instant invention are useful as biological toxicants, particularly as herbicides. Some of the new estervinylated alcohols are particularly good insecticides. All of the estervinylated alcohols are potentially useful as monomers for the production of polymers useful for a wide variety of applications depending on the particular estervinylated alcohol monomer. The halogen containing, particularly the fluorine containing, estervinylated alcohols form polymers which have flameproofing properties. The polymers produced from the estervinylated alcohols are made by conventional means well known in the acrylate polymerization art. By transesterification the lower alkyl esters can be used to make higher alkyl esters or aralkyl esters. The estervinylated alcohols, having olefinic unsaturation, are useful as cross-linking agents, e.g., for ethylene- or styrene-maleic anhydride copolymers; and, the estervinylated alcohols are useful generally as chemical intermediates for a wide variety of compounds formed by addition at the olefinic bond, e.g., halogenation, hydrogenation, etc. A further use for the estervinylated alcohols is as plasticizers and softening agents, e.g., for polyvinyl chloride.

It is an object of this invention to provide new and useful estervinylated alcohols.

It is another object of this invention to provide new compounds having herbicidal activity that are particularly useful in the inhibition of the germination of seeds when applied to soil.

These and other objects of the invention will become apparent in the detailed description of the invention which follows.

By the method of the invention estervinylated alcohols are made. This method involves the reaction of an (alkynyl) cycloaliphatic alcohol with a propiolate in the presence of a basic catalyst. Normally it will be preferred to carry out the reaction in the presence of an inert organic diluent or solvent, although the reaction will proceed in the absence of a solvent. For optimum yields and shortened reaction time normally it will be preferred to carry the reaction out at elevated temperature, i.e., temperatures in excess of room temperature (20–25° C.). Many times if a solvent is used the reflux temperature of the solvent is a suitable reaction temperature with good agitation being provided by the boiling solvent. If desired, of course, the reactants can also be mechanically agitated.

In carrying out the method of the invention any (alkynyl) cycloaliphatic alcohol can be used; however, if the alcohol contains more than one hydroxy group or other reactive groups, a portion of the propiolate will be consumed in side reactions. Normally (alkynyl) cycloaliphatic alcohols will be used having from 6 to 12 carbon atoms, although these alcohols can have additional ring substituents of any number of carbon atoms without departing from the scope of the invention. The (alkynyl) cycloaliphatic alcohols can contain acetylenic or olefinic unsaturation in the carbocyclic portion of the molecule. Also the alcohols can contain other substituent groups such as alkoxy, disubstituted amino groups, nitro groups, halo groups, cyano groups, thiocyano groups, etc., which are not reactive in the method of the invention so will not consume propiolate in side reactions.

The following are an illustrative but non-limiting listing of (alkynyl) carbocyclic alcohols which are particularly useful in the method of the invention: the 1-(alkynyl) cyclohexyl alcohols such as 1-ethynylcyclohexanol, 1-(1-propynyl) cyclohexanol, 1-(2-propynyl) cyclohexanol, 1-(1-butynyl) cyclohexanol, 1-(1-pentynyl) cyclohexanol, 1-(1-hexynyl) cyclohexanol; the 1-(alkynyl) cyclopentyl alcohols such as 1-ethynylcyclopentanol, 1-(1-propynyl) cyclopentanol, 1-(2-propynyl) cyclopentanol, 1-(1-butynyl) cyclopentanol, 1-(1-pentynyl) cyclopentanol; the 1-(alkynyl) cyclobutyl alcohols such as 1-ethynylcyclobutanol, 1-(1-propynyl) cyclobutanol, 1-(2-propynyl) cyclobutanol, 1-(1-butynyl) cyclobutanol, 1-(1-hexynyl) cyclobutanol; the (alkynyl) cyclohexenyl alcohols such as any of the isomeric ethynylcyclohexenols, the isomeric (1-propynyl) cyclohexenols, the isomeric (2-propynyl) cyclohexenols, the isomeric (1-butynyl) cyclohexenols; the (alkynyl) cyclopentenyl alcohols such as the isomeric ethynylcyclopentenols, the isomeric (1-propynyl) cyclopentenols, the isomeric (2-propynyl) cyclopentenols; the (alkynyl) cyclobutenyl alcohols; etc. These lower alkynyl carbocyclic alcohols are particularly useful when reacted with a propiolate by the method of the invention to produce extremely active preemergent herbicides. Especially preferred of these alcohols are the ethynyl- and propynyl-substituted carbocyclic alcohols.

The preferred propiolates to use in the process of the invention are compounds of the formula R'C≡CCOOR, wherein R is an alkyl group having from 1 to 22 carbon atoms, preferably a lower alkyl group (1 to 6 carbon atoms), and R' is hydrogen or a hydrocarbon radical free of non-benzenoid unsaturation having from 1 to 6 carbon atoms. Non-benzenoid unsaturation is aliphatic or cycloaliphatic unsaturation as contrasted to benzenoid unsaturation which is aromatic unsaturation. An illustrative listing not meant to be limiting of suitable propiolates is as follows: methyl propiolate, ethyl tetrolate, n-propyl isopropylpropiolate, isopropyl n-propylpropiolate, n-butyl t-butylpropiolate, isobutyl n-butylpropiolate, t-butyl n-butylpropiolate, n-amyl propiolate, n-hexyl n-amylpropiolate, n-hexyl n-hexylpropiolate, methyl phenylpropiolate, methyl cyclohexylpropiolate, n-heptylpropiolate, n-octyl propiolate, isooctyl propiolate, ethylhexyl propiolate, n-nonyl propiolate, n-decyl propiolate, tridecyl propiolate, pentadecyl propiolate, heptadecyl propiolate, eicosyl propiolate, docosyl propiolate, etc. Among some of the long chain esters it has not been specified whether they are straight chain or branched, but it is intended to cover both and mixtures thereof. The oxo process which is well known produces branched chain alcohols suitable for making these long chain propiolates from propiolic acid or by ester exchange with short chain esters, and of course, the straight long chain alcohols useful for the same purposes are also well known.

It appears that the temperature of the reaction is not critical in that the reaction will take place at room temperature (20–25° C.) or lower on up to a temperature to about 100° C. or higher. Normally it will be desired to operate the reaction at elevated temperatures, i.e., above room temperature. Suitably in many cases the reflux temperature of the solvent or diluent is used, if a solvent or diluent is used. For some of the more reactive propiolates and (alkynyl) carbocyclic alcohols it may even be desirable to cool the reaction mixture to remove the exothermic heat of reaction. Obviously, a temperature will eventually be reached at which substantial decomposition of the reactants or products will occur, and it is desirable to operate the process below these temperatures.

The basic catalyst useful in the method of the invention can be a weakly basic catalyst, such as pyridine, but I prefer to employ the strongly basic catalyst such as an alkali metal hydroxide, e.g., sodium hydroxide, potassium hydroxide, lithium hydroxide, rubidium hydroxide or cesium hydroxide, preferably sodium, potassium or lithium hydroxides. These catalysts need be present only in catalytic not stoichiometric amounts as compared to the alcohol and propiolate reactants. Larger amounts than catalytic amounts of the catalysts can be tolerated but are not desirable or necessary, since normally the removal of the larger amounts of catalyst from the reaction mixture results in decreased product yields. A particularly desirable type of catalyst is formed in situ by adding alkali metal to the alcohol reactant forming a catalytic amount of the alkali metal oxide of the alcohol. Some examples of another type of strongly basic catalysts especially suitable for the method of the invention are the strongly basic quaternary ammonium hydroxide catalysts, such as, benzyltrimethylammonium hydroxide, dibenzyldimethylammonium hydroxide, or the like or a mixture of such hydroxides.

As has been already stated a solvent or diluent for the reaction is not necessary but in many cases will be very desirable. Any inert organic solvent will be suitable. Especially suitable are the aromatic hydrocarbon solvents such as benzene, toluene, xylene, etc. Also useful are the aliphatic hydrocarbon solvents such as hexane, heptane, octane, etc., and if the reaction were carried out under pressure it might be desirable to use a lower boiling hydrocarbon solvent, such as propane or butane. Other miscellaneous solvents illustrative of useful organic solvents are such compounds as chloroform, carbon tetrachloride, di-n-butyl ether, tetrahydrofuran, etc. It is not desirable to use water as a medium for the reaction since normally substantial hydrolysis will occur and the yield of the desired product will be low.

Except in the cases of the very active (alkynyl) carbocyclic alcohols and propiolate it may be desirable to use an excess of either the alcohol or propiolate reactant. In the case of the very reactive alcohols and propiolates undesirable side reactions may take place in appreciable amounts involving the disubstitution of the alcohol with the propiolate, and this side reaction is increased if an excess of the alcohol is used. Many times in cases of not overly active propiolates and alcohols it will be desirable to use either an excess of the propiolate or the alcohol as a solvent or diluent for the reaction. This excess amount of reactant is, of course, easily removed by distillation, or other purification procedure, in the isolation of the desired product. Suitably, however, equimolar amounts of alcohol and propiolate are used since they react in one to one molar ratio in the reaction of the invention.

Within the scope of the invention is the reaction of propiolates with halo-substituted (alkynyl) carbocyclic alcohols such as 2,3-dichloro-1-ethynylcyclohexanol, 2,3-difluoro-1-ethynylcyclohexanol, 2,3-dibromo-1-ethynylcyclohexanol, etc.

The halogenated cycloaliphatic alcohols illustrated specifically above are particularly useful when reacted with the propiolate to form estervinylated compounds useful as monomers for making flame-resistant polymer which can be used in coating compositions to coat materials which are thus made flame-resistant. Also estervinylated compounds made from these halo alcohols can be polymerized and made into films and fibers which have this useful flame-resistant property and also into containers or fabrics having the flame resistance. Low molecular weight polymers made by conventional polymerization procedures using free-radical catalysts, e.g., peroxides such as t-butyl peroxide and benzoyl peroxide, azoisobutyronitrile, etc. are useful as polyvinyl chloride plasticizers. The monomers themselves can be used as polyvinyl chloride stabilizers to scavenge hydrogen chloride. A further use for the monomers, i.e., the reaction product of the (alkynyl) carbocyclic alcohols and propiolates, is as biological toxicants, e.g., herbicides, insecticides, fungicides, nematocides, miticides, bactericides, etc.

An illustrative listing of the alkyl β-[1-(alkynyl)cyclohexoxy]-acrylates of the invention is as follows: methyl β - (1 - ethynylcyclohexoxy) - acrylate ethyl β-[1-(propynyl)cyclohexoxy]acrylate, isopropyl β - [1 - (2 - propynyl)cyclohexoxy]acrylate, methyl β - [1 - (1 - propynyl)cyclohexoxy]acrylate, methyl β - [1 - (2 - propynyl)cyclohexoxy]acrylate, t - butyl β - [1 - (1 - butynyl)cyclohexoxy]acrylate, isobutyl β-[1-(1-pentynyl)-cyclohexoxy]acrylate, n - hexyl β - [1 - (1 - hexynyl)cyclohexoxy]acrylate, methyl β-(1-ethynylcyclohexenoxy)-acrylate, ethyl β - [1 - (1 - propynyl)cyclopentenoxy]acrylate, methyl β - [1 - (2 - propynyl)cyclobutenoxy]acrylate, etc.

The invention will be more clearly understood from the following detailed description of a specific example of my process and a new compound prepared thereby. It will be appreciated that variations in proportions, reactants, reaction conditions, etc., can be made without departing from the invention.

Example 1

This example illustrates the preparation of methyl β-(1-ethynylcyclohexoxy)acrylate. A mixture of 1.0 g. of sodium and 24.8 g. (0.2 mole) of 1-ethynylcyclohexanol was heated at 100° C. After most of the sodium had reacted a gel was formed and 100 ml. of benzene was added to dilute the reaction mixture. Heating of the reaction mixture was continued at benzene reflux until all the sodium had reacted. Then 8.4 g. (0.1 mole) of methyl propiolate was added dropwise to the reaction mixture. After all the methyl propiolate had been added the reactants were heated at reflux for 12 hours, during which time two additional 100 ml. portions of benzene were added to reduce the viscosity of the reaction mixture. The black reaction mixture was cooled and was washed first with a portion of saturated aqueous ammonium chloride and then with water. After evaporation of the benzene the washed reaction mixture was distilled to give the following fractions:

| Fraction | Boiling Point, ° C./0.3 mm. | Refractive Index, $n_D^{25}$ |
| --- | --- | --- |
| 1 | 35–84 | |
| 2 | 85–88 | 1.4849 |
| 3 | 118–136 | |
| Residue | | |

Fraction No. 1 was a colorless liquid, largely 1-ethynylcyclohexanol, and Fraction No. 2 was the desired product in the form of a yellow oil. Fraction No. 3 and the pot residue were not identified. The desired product, Fraction No. 2, was submitted for elemental analysis with the following results:

| Percent | Found | Calculated $C_{12}H_{16}O_3$ |
| --- | --- | --- |
| C | 69.0 | 69.2 |
| H | 8.9 | 7.7 |

An infrared absorption spectra on this product yielded the following:

| | |
|---|---|
| 3400 cm.$^{-1}$ | OH very weak. |
| 3200 cm.$^{-1}$ | C≡CH. |
| 2950–28950 cm.$^{-1}$ | CH aliphatic. |
| 2100 cm.$^{-1}$ | C≡CH weak. |
| 1700 cm.$^{-1}$ | C=O. |
| 1640 cm.$^{-1}$ | C=C. |
| 1400 cm.$^{-1}$ | CH$_2$ and CH$_3$. |
| 1300, 1180 and 1130 cm.$^{-1}$ | C—O ester and ether. |

Thus it is seen from the above elemental analysis and infrared analysis that the desired methyl β-(1-ethynylcyclohexoxy)acrylate has been produced.

*Example 2*

The product of Example 1, methyl β-(1-ethynylcyclohexoxy)acrylate, was tested as a preemergent herbicide and proved to be very good. The relative value of this compound was determined by planting, in greenhouse flats, seeds of a number of different plants each representing a principal botanical type and treating the flats with the herbicide at rates equivalent to 25 pounds per acre or less, and then noting the herbicidal effects. In these tests the following plants were represented (designated by letters):

A—Morning glory         G—Crab grass
B—Wild oats             H—Pigweed
C—Rye grass             I—Wild buckwheat
D—Radish-mustard        J—Tomato
E—Sugar beet            K—Sorghum
F—Barnyard grass The relative value of each compound with respect to its herbicidal effect on the various plant is indicated by a number as follows:

0—No phytotoxicity
1—Slight phytotoxicity
2—Moderate phytotoxicity
3—Severe phytotoxicity In tests at the rate of 25 lbs./acre the following observations were made with regard to the compound tested:

| Compound | A | B | C | D | E | F | G | H | I | J | K |
|---|---|---|---|---|---|---|---|---|---|---|---|
| Methyl β-(1-ethynylcyclohexoxy)acrylate | 1 | 0 | 0 | 3 | 3 | 0 | 0 | 1 | 3 | 3 | 3 |

In further tests at lower concentrations preemergent herbicidal activity was demonstrated with broadleaf specificity down to as low as 1 lb./acre for the methyl β-(1-ethynylcyclohexoxy)acrylate. The herbicidal activity of the various compounds of the invention will vary to a degree depending upon the compound selected. Depending upon the particular compound used and whether general or broadleaf specific herbicidal activity is desired applications of the compounds may vary from about 1 lb./acre to about 100 lbs./acre. But for broadleaf specificity normally the compounds will be applied in the range of about 2 to 15 lbs./acre.

The compounds can be applied with either liquid or solid inert carriers. Frequently the compounds are applied diluted with solid carriers in the form of "dust" which can contain in addition to the active ingredients diluents or extenders, dispersing agents to prevent local high concentrations, and agents to facilitate distribution in soil or water. Suitable solid diluents are those which render the compositions permanently dry and free flowing. Thus hygroscopic materials are to be avoided unless the composition also contains a separate substance to serve as an aid to flow ability. Effective solid diluents, preferably pulverulent or granular in form so as to be effective carriers for the active ingredient, include the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if mixed with the surface soil by means of a disk-plow or harrow at the time of application.

The liquid compositions for herbicidal use may be solutions or other liquid dispersions. A choice of a liquid medium will depend to some extent upon the physical properties of the active ingredient. If water is the liquid medium normally a dispersing agent will be required unless the particular active ingredient is sufficiently soluble in water. Materials which aid in dispersing the active ingredients of the invention in herbicidal compositions are surface active agents which serve in providing uniform dispersions of all formulation components both solid and liquid types. Water insoluble active herbicidal agents of the invention can, of course, if desired be dispersed in organic solvents and so applied; however, normally water will be the most desirable medium for applying the herbicide. All types of surface active agents can be considered as dispersing agents, i.e., anionic, cationic and nonionic types, including conventional soaps such as water-soluble salts of long chain carboxylic acids, the amino soaps such as amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensates of fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example, less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example, isopropanol, benzene, acetone, methyl ethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

What is claimed is:

1. A compound of the formula R′OCH=CHCOOR, wherein R is an alkyl radical having from 1 to 6 carbon atoms and R′ is a 1-alkynylcycloalkyl radical wherein the cycloalkyl ring contains 4 to 6 carbon atoms and the alkynyl moiety contains 2 to 6 carbon atoms.

2. Methyl β-(1-ethynylcyclohexoxy)acrylate.

References Cited by the Examiner

UNITED STATES PATENTS

| | | | |
|---|---|---|---|
| 2,523,228 | 9/50 | Mullison | 71—2.6 |
| 2,535,010 | 12/50 | Croxall et al. | 260—484 |
| 2,665,204 | 1/54 | Swezey | 71—2.6 |
| 2,834,800 | 5/58 | Trapp et al. | 260—468 XR |
| 2,835,695 | 5/58 | Steinhauer | 260—468 |
| 2,848,478 | 8/58 | Pratt | 260—468 |

OTHER REFERENCES

Croxall et al.: J. Am. Chem. Soc., volume 71, page 2738 (1949).

Raphael: Acetylene Compounds in Organic Synthesis, pages 37–8, Academic Press, 1955.

Reppe: Acetylene Chemistry, P. G. Report 18852-S, pages 32–3, (1949).

LORRAINE A. WEINBERGER, *Primary Examiner.*

DUVAL McCUTCHEN, IRVING MARCUS,
*Examiners.*